(12) United States Patent
Chen et al.

(10) Patent No.: US 10,574,411 B2
(45) Date of Patent: *Feb. 25, 2020

(54) HIGH EFFICIENCY SIGNAL FIELD ENCODING STRUCTURE

(71) Applicant: Intel IP Corporation, Santa Clara, CA (US)

(72) Inventors: Xiaogang Chen, Portland, OR (US); Qinghua Li, San Ramon, CA (US); Yuan Zhu, Beijing (CN); Rongzhen Yang, Shanghai (CN); Hujun Yin, Saratoga, CA (US)

(73) Assignee: Intel IP Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/910,761

(22) Filed: Mar. 2, 2018

(65) Prior Publication Data

US 2018/0359062 A1    Dec. 13, 2018

Related U.S. Application Data

(63) Continuation of application No. 14/998,281, filed on Dec. 24, 2015, now Pat. No. 9,912,452.

(60) Provisional application No. 62/189,449, filed on Jul. 7, 2015.

(51) Int. Cl.
*H04L 5/00* (2006.01)

(52) U.S. Cl.
CPC ............... *H04L 5/003* (2013.01); *H04L 5/00* (2013.01)

(58) Field of Classification Search
CPC .......... H04L 5/00; H04L 5/003; H04W 84/12; H04W 84/18; H04W 28/04; H04W 80/04
See application file for complete search history.

(56) References Cited

U.S. PATENT DOCUMENTS

| | | |
|---|---|---|
| 2015/0139089 A1 | 5/2015 | Azizi et al. |
| 2015/0327217 A1 | 11/2015 | Aboul-Magd et al. |
| 2016/0007342 A1 | 1/2016 | Seok |
| 2016/0044676 A1* | 2/2016 | Choi ............... H04W 72/1289 370/329 |
| 2016/0056943 A1 | 2/2016 | Stacey et al. |
| 2016/0100396 A1* | 4/2016 | Seok ..................... H04L 5/003 370/329 |
| 2016/0219573 A1 | 7/2016 | Ghosh |
| 2016/0249381 A1* | 8/2016 | Choi ..................... H04W 74/06 |
| 2017/0280453 A1* | 9/2017 | Choi ..................... H04W 72/08 |
| 2017/0289963 A1* | 10/2017 | Choi ..................... H04W 72/04 |

(Continued)

*Primary Examiner* — Chi Ho A Lee
*Assistant Examiner* — Andrew Lee
(74) *Attorney, Agent, or Firm* — Eversheds Sutherland (US) LLP

(57) ABSTRACT

This disclosure describes methods, apparatus, and systems related to a high efficiency signal field encoding structure. A device may determine a communications channel having a bandwidth of a frequency band. The device may determine a first group of subchannels of the bandwidth and a second group of subchannels of the bandwidth. The device may determine a high efficiency signal field to be transmitted on the communications channel to a first device. The device may encode the high efficiency signal field using the first group of subchannels and the second group of subchannels. The device may cause to send the high efficiency signal field to the first device.

19 Claims, 14 Drawing Sheets

(56) References Cited

U.S. PATENT DOCUMENTS

2017/0303280 A1* 10/2017 Chun ..................... H04L 27/26
2017/0373901 A1* 12/2017 Lim .................... H04L 27/2613
2018/0359807 A1* 12/2018 Kim ......................... H04L 5/00

* cited by examiner

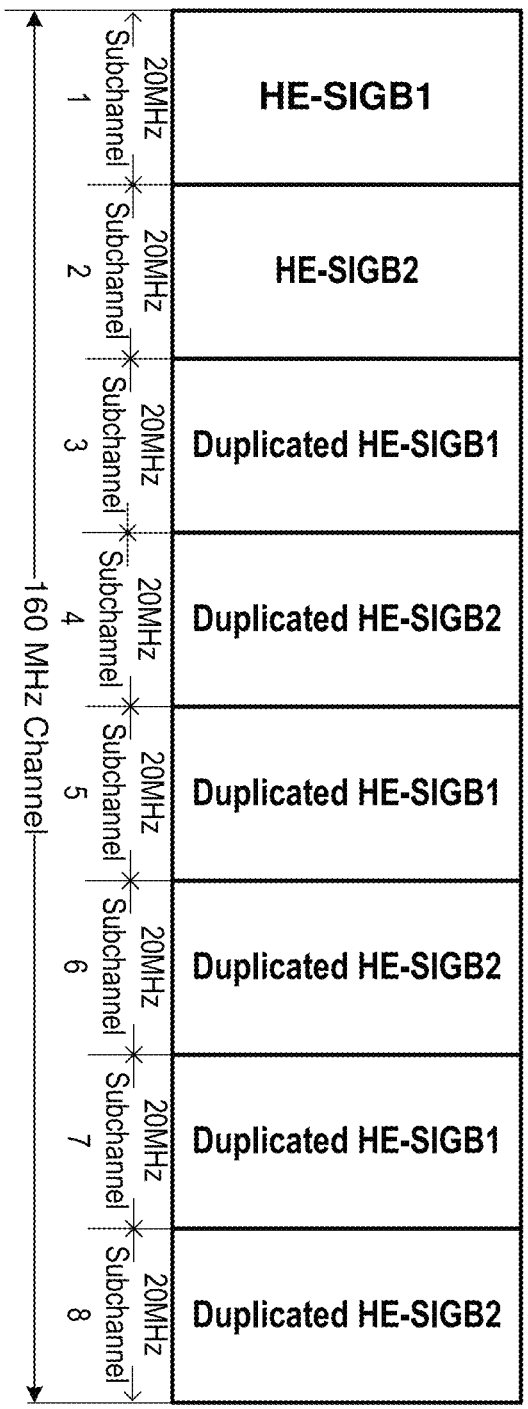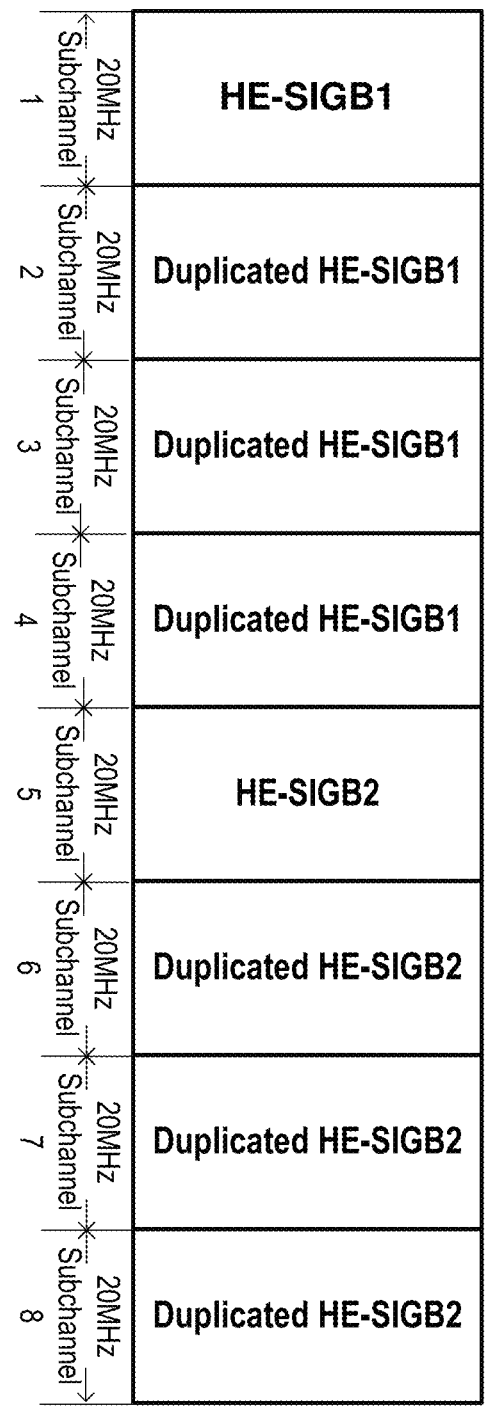
FIG. 5A   FIG. 5B
FIGs. 5A-5B

HIGH EFFICIENCY SIGNAL FIELD ENCODING STRUCTURE

CROSS-REFERENCE TO RELATED APPLICATIONS

This application is a continuation of U.S. application Ser. No. 14/998,281 filed Dec. 24, 2015 which claims the benefit of U.S. Provisional Application No. 62/189,449 filed Jul. 7, 2015 the disclosure of which is incorporated herein by reference in its entirety.

TECHNICAL FIELD

This disclosure generally relates to systems and methods for wireless communications and, more particularly, high efficiency signal field encoding structure in wireless communications.

BACKGROUND

Wireless devices are becoming widely prevalent and are increasingly requesting access to wireless channels. A next generation WLAN, IEEE 802.11ax or High-Efficiency WLAN (HEW), is under development. HEW utilizes Orthogonal Frequency-Division Multiple Access (OFDMA) in channel allocation.

BRIEF DESCRIPTION OF THE DRAWINGS

FIGS. 5A-5B depict illustrative schematic diagrams of a high efficiency signal field encoding structure, in accordance with one or more example embodiments of the present disclosure.

DETAILED DESCRIPTION

Figure 1:
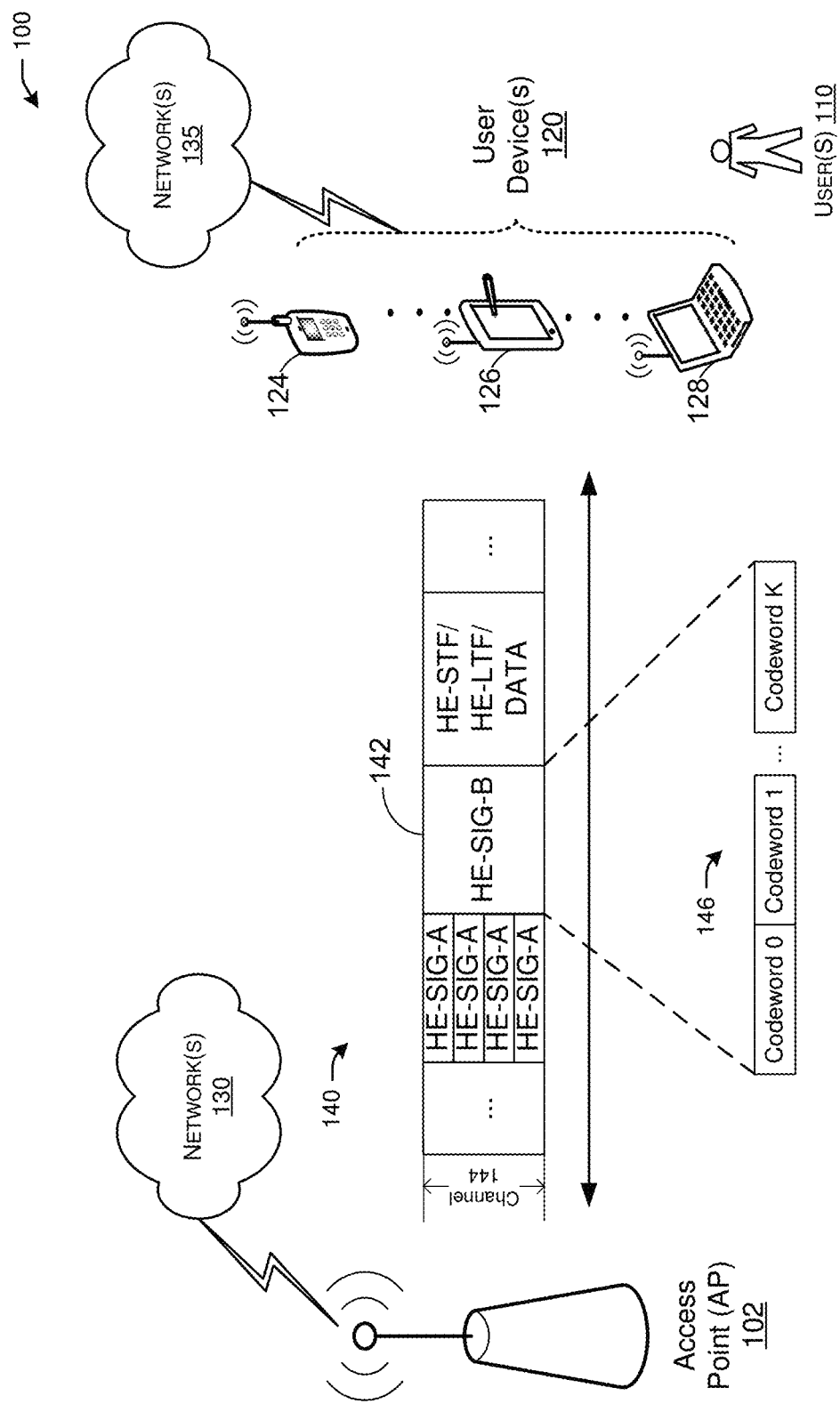
FIG. 1 depicts a network diagram illustrating an example network environment of an illustrative high efficiency signal field parallel coding system, according to one or more example embodiments of the disclosure.

Example embodiments described herein provide certain systems, methods, and devices, for providing signaling information to Wi-Fi devices in various Wi-Fi networks, including, but not limited to, IEEE 802.11ax (referred to as HE or HEW).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

During communication between two devices, one or more frames may be sent and received. These frames may include one or more fields (or symbols) that may be based on an IEEE 802.11 standard. In a high efficiency communication (e.g., HEW) these one or more fields may be represented by one or more OFDMA symbols. The one or more fields may include some legacy signal fields and some high efficiency signal fields. A high efficiency signal field (HE-SIG) may be made up of two high efficiency signal fields (e.g., HE-SIG-A and HE-SIG-B). HE-SIG-A and/or HE-SIG-B may describe attributes of the one or more frames, such as, the channel width, modulation and coding, and whether the frame is a single or multi-user frame. HE-SIG-B may be encoded across an entire bandwidth (e.g., 80 MHz) or may be encoded within each 20 MHz subchannels of, for example, an 80 MHz bandwidth. In that case, the information in each subchannel is independent and separately encoded with each other. Therefore, each subchannel will have a distinct HE-SIG-B encoding.

Example embodiments of the present disclosure relate to systems, methods, and devices for high efficiency signal field encoding structure that facilitate limiting the number of encoding processes for HE-SIG-B to two or three processes. Therefore, 20 MHz subchannels may be divided into two groups and encoded by two encoding processes. That is, instead of having each 20 MHz subchannel independently encoded, two 20 MHz subchannels may form a group of subchannels to be encoded by one process. The signaling codebits from each HE-SIG-B encoding process and the corresponding data signaled by the encoding process may be sent over the same subchannel group. The numbers of subchannels in each group may be the same or different.

In one embodiment, the loads on the two encoding processes are likely to be different. The loads on the encoding processes may be represented in blocks. These blocks may be codebits that may be representative of a user specific part, a group of user specific parts, content of an OFDM symbol, or one forward error correction (FEC) codeword. Loads may be balanced by moving them to other subchannels such that signaling overhead and padding overhead may be minimized. In the case of HEW, some codebits from an HE-SIG-B encoding process of a subchannel group may be sent by another subchannel group. Namely, the signaling information and the corresponding data portion may be sent over different subchannel groups for the offloaded users in order to minimize the padding necessary to keep the two subchannels balanced. In another embodiment, repetition of one or more loads may be used to replace padding, which may increase decoding reliability at the receiving device.

FIG. 1 is a network diagram illustrating an example network environment, according to some example embodiments of the present disclosure. Wireless network 100 may include one or more user devices 120 and one or more access point(s) (AP) 102, which may communicate in accordance with IEEE 802.11 communication standards, including IEEE 802.11ax. The user device(s) 120 may be mobile devices that are non-stationary and do not have fixed locations.

Figure 10:
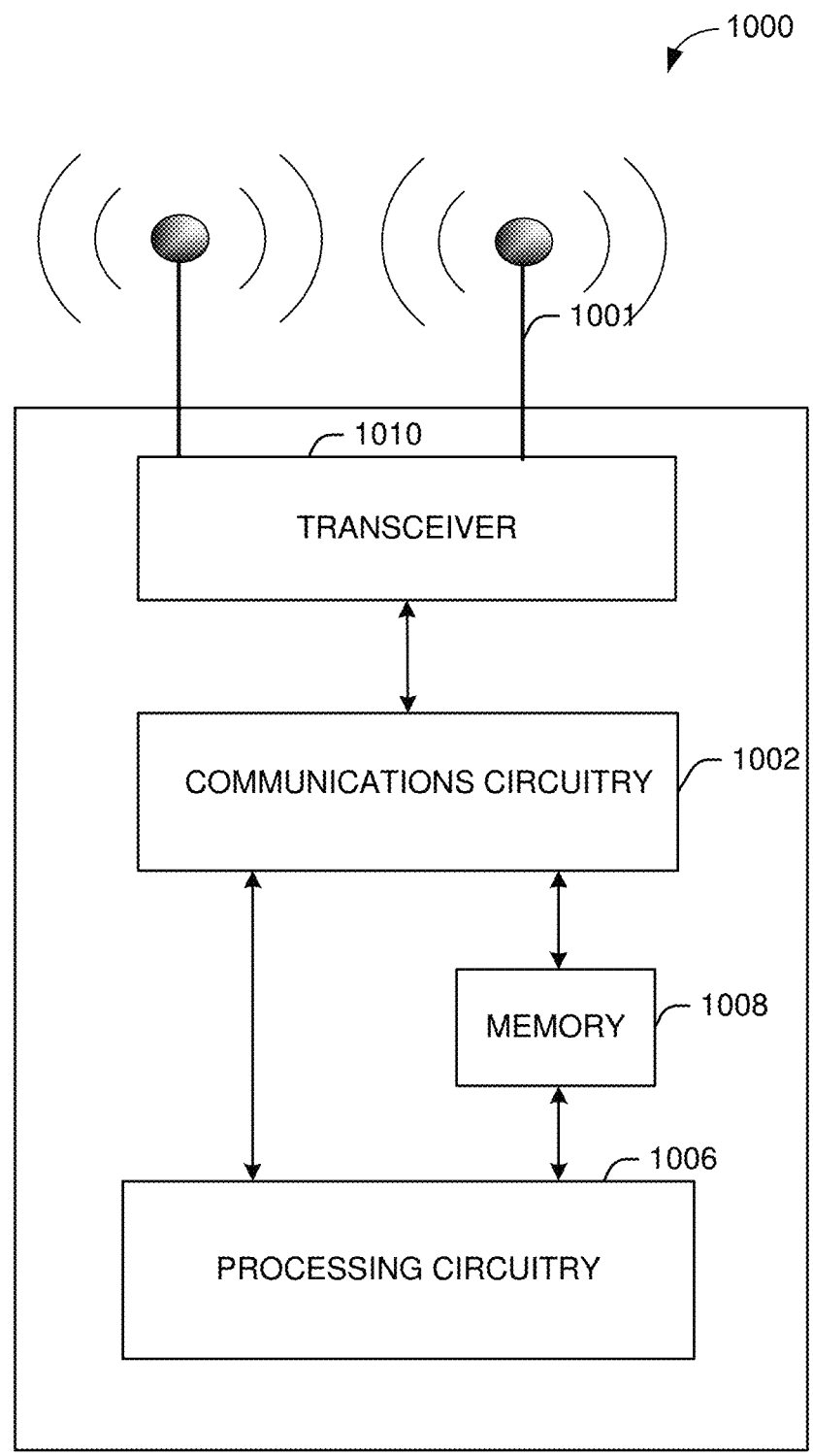
FIG. 10 illustrates a functional diagram of an example communication station that may be suitable for use as a user device, in accordance with one or more example embodiments of the disclosure.
Figure 11:
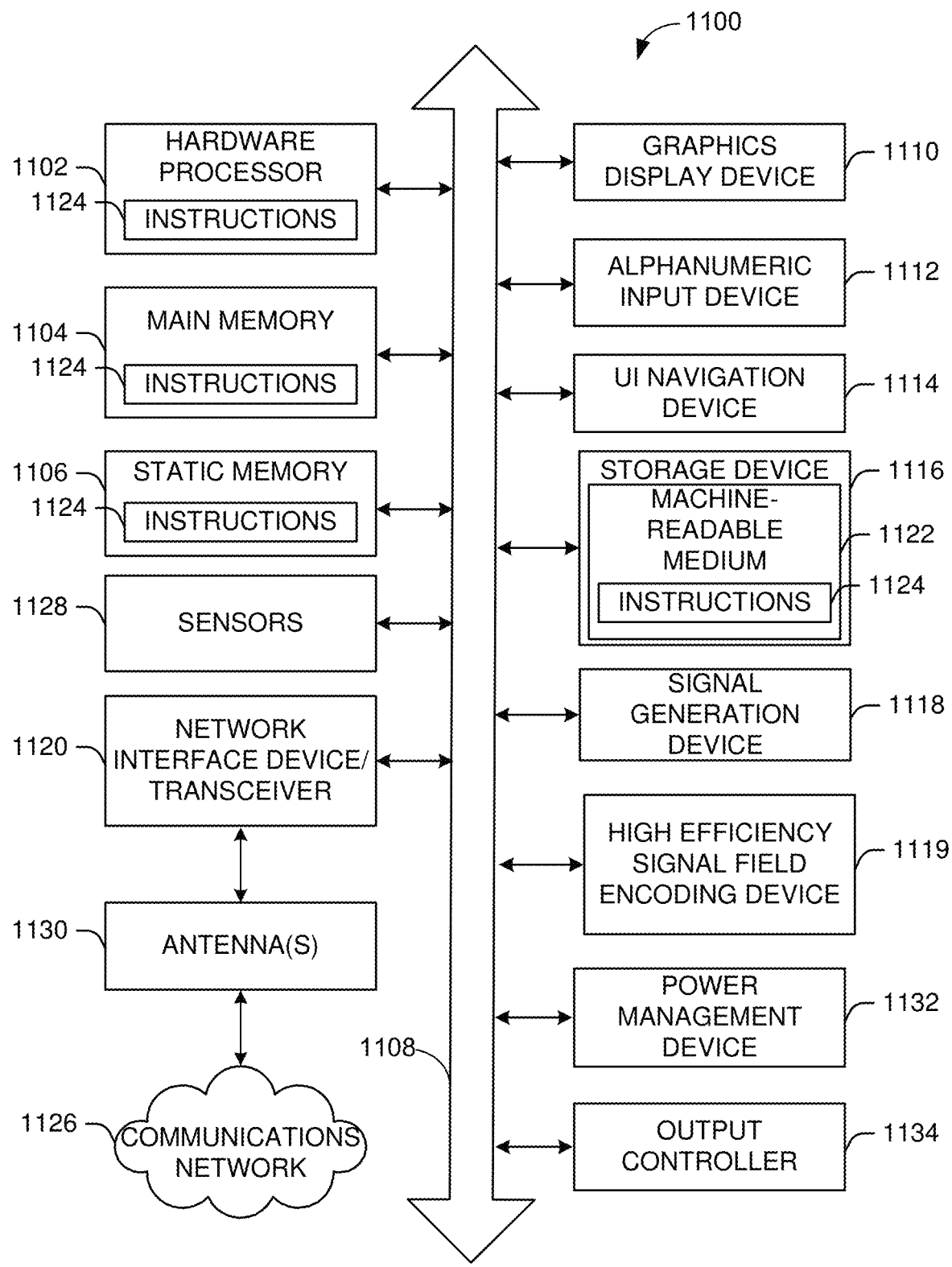
FIG. 11 is a block diagram of an example machine upon which any of one or more techniques (e.g., methods) may be performed, in accordance with one or more embodiments of the disclosure.

In some embodiments, the user devices 120 and AP 102 may include one or more computer systems similar to that of the functional diagram of FIG. 10 and/or the example machine/system of FIG. 11.

One or more illustrative user device(s) 120 may be operable by one or more user(s) 110. The user device(s) 120 (e.g., 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennae. Communications antenna may be any suitable type of antenna corresponding to the communications protocols used by the user device(s) 120 (e.g., user devices 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an AP (e.g., AP 102) establishes communication with one or more user devices 120 (e.g., user devices 124, 126, and/or 128), the AP may communicate in the downlink direction by sending data frames. The data frames may be preceded by one or more preambles that may be part of one or more headers. These preambles may be used to allow the user device to detect a new incoming data frame from the AP. A preamble may be a signal used in network communications to synchronize transmission timing between two or more devices (e.g., between the APs and user devices).

In one embodiment, and with reference to FIG. 1, an HEW preamble (e.g., preamble 140) may include one or more fields, such as, a high efficiency signal A (HE-SIG-A) field, a high efficiency signal B (HE-SIG-B) field 142, and other fields such as high efficiency short training field (HE-STF), high efficiency long training field (HE-LTF), data field, etc. It is understood that the above acronyms may be different and not to be construed as a limitation as other acronyms maybe used for the fields included in an HEW preamble.

In one embodiment, during a communication between the AP 102 and one or more user devices 120 data is transmitted and received between these devices on a transmission channel (e.g., channel 144). For example, when a user device 120 transmits a data packet to the AP 102, the data may be first encoded before transmission. The data encoding may occur over the transmission channel 144 in frequency and/or time domain. Channel 144 may be divided into one or more subchannels. Since HEW data packets may include HEW preambles such as preamble 140, the data included in the preambles also may be encoded. The HE-SIG-B field may be encoded into one or more codebits or codewords. For example, HE-SIG-B may be encoded into codewords 146, having codewords 0 through k, where k is an integer, before being transmitted to a receiving device. In the example of FIG. 1, HE-SIG-B is shown to be encoded over the entire channel 144.

In one embodiment, instead of independently encoding the data over the entire channel 144 or each subchannel, the data may be encoded over a group of subchannels. For example, if channel 144 is an 80 MHz frequency channel, there may be two groups of 20 MHz subchannels, where each group includes two 20 MHz subchannels. A first encoding process may encode data over a first group of subchannels and a second encoding process may encode data over a second group of subchannels. This way, the codebits or codewords generated by the first encoding process may be sent over the first group of subchannels and the codebits or codewords generated by the second encoding process may be sent over the second group of subchannels.

Figure 2A:
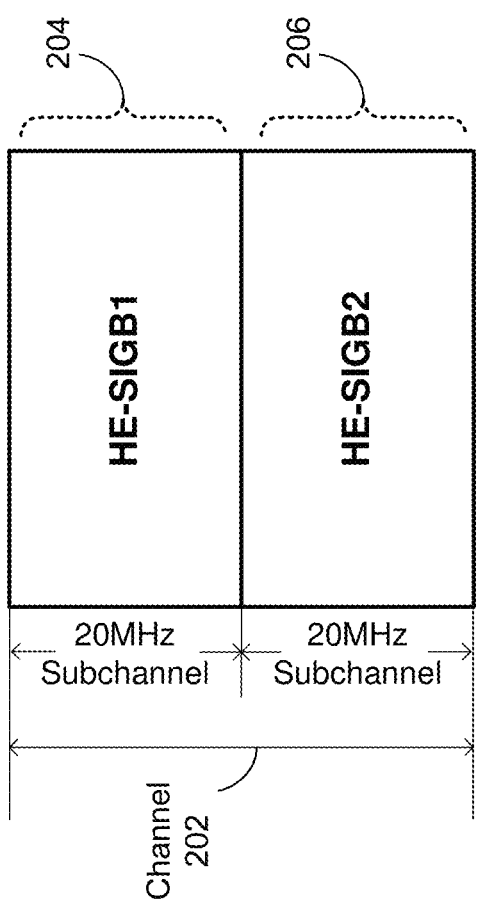
FIGS. 2A-2B depict illustrative schematic diagrams of a high efficiency signal field encoding structure, in accordance with one or more example embodiments of the present disclosure.
Figure 2B:
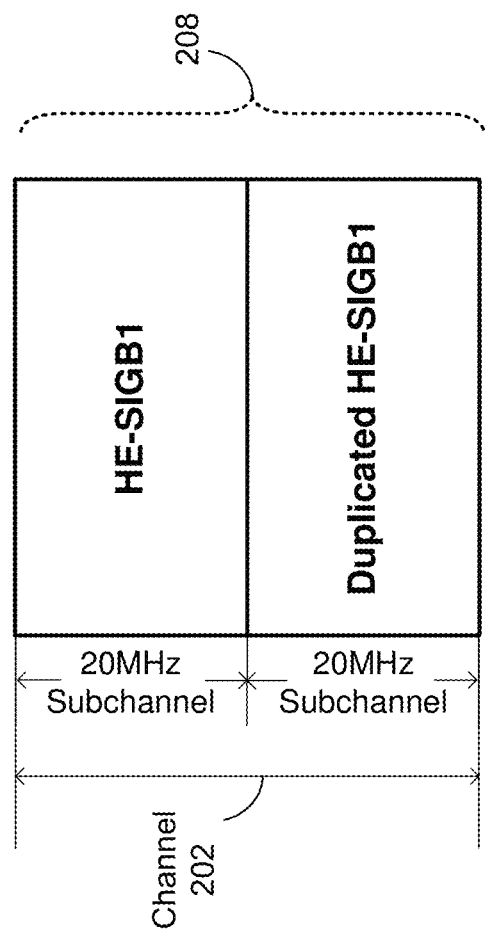

FIGS. 2A-2B depict illustrative schematic diagrams of a high efficiency signal field (e.g., HE-SIG-B) encoding structure, in accordance with one or more example embodiments of the present disclosure.

In one embodiment, the number of encoding processes may be limited to a predetermined number. For example, the high efficiency signal field parallel coding system may limit the number of encoding/decoding processes to two or three processes.

Typically, data is independently encoded using separate encoding processes over each channel or subchannel. For example, HE-SIG-B is typically independently encoded for each channel or subchannel. For example in an 80 MHz channel, four decoding processes may be needed at the device that receives that data. Further, for 160 MHz, eight processes are needed. This may require increasing the memory size and control logic complexity.

In one embodiment, two processes may be used as an example and the extension to three is straightforward. When channel bonding (e.g., non-contiguous channel bonding) is applied, different sizes of channel e.g. 60 Hz, 100 MHz may be available. The constituent 20 MHz subchannels may still be divided into two subchannel groups.

In one embodiment, if the encoding of HE-SIG-A indicates that the current PPDU (a physical layer convergence protocol (PLCP) data unit) is transmitted on two 20 MHz subchannels with a total of 40 MHz, HE-SIG-B, which may consist of HE-SIG-B1 and HE-SIG-B2, may be divided into two encoding processes, where the first process encodes HE-SIG-B1 and the second process encodes HE-SIG-B2, instead of having one process to encode the entire HE-SIG-B over channel 202. Each encoding process may independently encode the signaling information for one 20 MHz subchannel. In this scenario, two parallel encoders and decoders may be needed at the transmitting and receiving devices.

In the example of FIGS. 2A-2B, channel 202, which is a 40 MHz channel, the codebits of two encoding processes used to encode HE-SIG-B may be sent over two 20 MHz subchannels. For example, HE-SIG-B may be sent over channel 202, which comprises two 20 MHz subchannels. Referring to FIG. 2A, HE-SIG-B may comprise HE-SIG-B1 and HE-SIG-B2. It may be possible to encode HE-SIG-B1 over the first 20 MHz subchannel within channel 202 using a first encoding process 204 and encode HE-SIG-B2 over the second 20 MHz subchannel within channel 202 using a second encoding process 206.

In another embodiment, and referring to FIG. 2B, one encoding process 208 may be used to encode HE-SIG-B1 in order to send the codebits over the whole channel 202. In that case, the codebits of HE-SIG-B1 may be sent over one 20 MHz subchannel and repeated on the other 20 MHz subchannel. It should be noted that the two 20 MHz subchannels may be contiguous or non-contiguous in frequency.

Figures 3A, 3B:
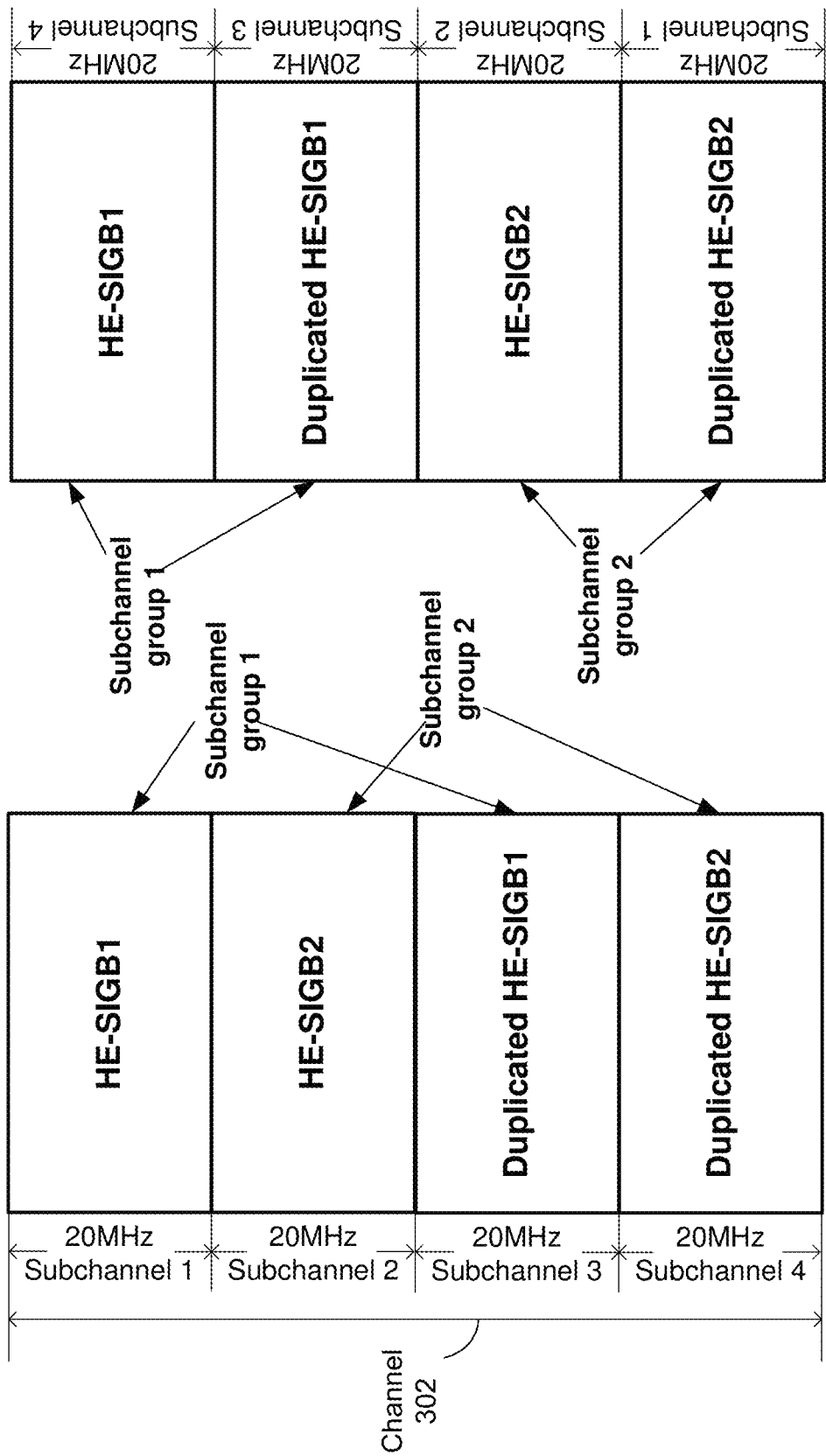
FIGS. 3A-3B depict illustrative schematic diagrams of a high efficiency signal field encoding structure, in accordance with one or more example embodiments of the present disclosure.

FIGS. 3A-3B depict illustrative schematic diagrams of a high efficiency signal field (e.g., HE-SIG-B) encoding structure, in accordance with one or more example embodiments of the present disclosure.

In one embodiment, if HE-SIG-A indicates that the current PPDU is transmitted over four 20 MHz subchannels with a total of 80 MHz (e.g., channel 302), HE-SIG-B may be divided into two independent encoding processes, each covering a distinct subchannel group with two 20 MHz subchannels (e.g., Group 1 or Group 2). Group 1 may consist of a first HE-SIG-B portion (e.g., HE-SIG-B1), and a duplicated HE-SIG-B1 portion. Group 2 may consist of a second HE-SIG-B portion (e.g., HE-SIG-B2), and a duplicated HE-SIG-B2 portion. Group 1 may be encoded using a first process, and Group 2 may be encoded using a second process. The encoding of both processes may generate codebits for each subchannel group. These codebits may represent the encoded HE-SIG-B field. The HE-SIG-B codebits of each subchannel group (e.g., Group 1 and Group 2) may be sent over the subchannel group where the signaled data allocations by the codebits are sent. That is, the codebits of HE-SIG-B1 and the duplicated HE-SIG-B1 may be sent over Group 1, and the codebits of HE-SIG-B2 and the duplicate HE-SIG-B2 may be sent over Group 2. However, since the data is duplicated (e.g., HE-SIG-B1 and duplicated HE-SIG-B1), the codebits of each subchannel group (e.g., Group 1 and/or Group 2) may be sent over one 20 MHz subchannel and then repeated on the other subchannels of the same group. It is understood that different duplication schemes corresponding to different groups of subchannels may be utilized. For example, in FIG. 3A, HE-SIG-B1 and duplicated HE-SIG-B1, may utilize subchannel 1 and subchannel 3 respectively, HE-SIG-B2 and duplicated HE-SIG-B2, may utilize subchannel 2 and subchannel 4 respectively; while in FIG. 3B, Group 2 that includes HE-SIG-B2 and duplicated HE-SIG-B2 may utilize subchannel 1 and subchannel 2 respectively. It should be appreciated that other combinations may be possible.

Figure 4:
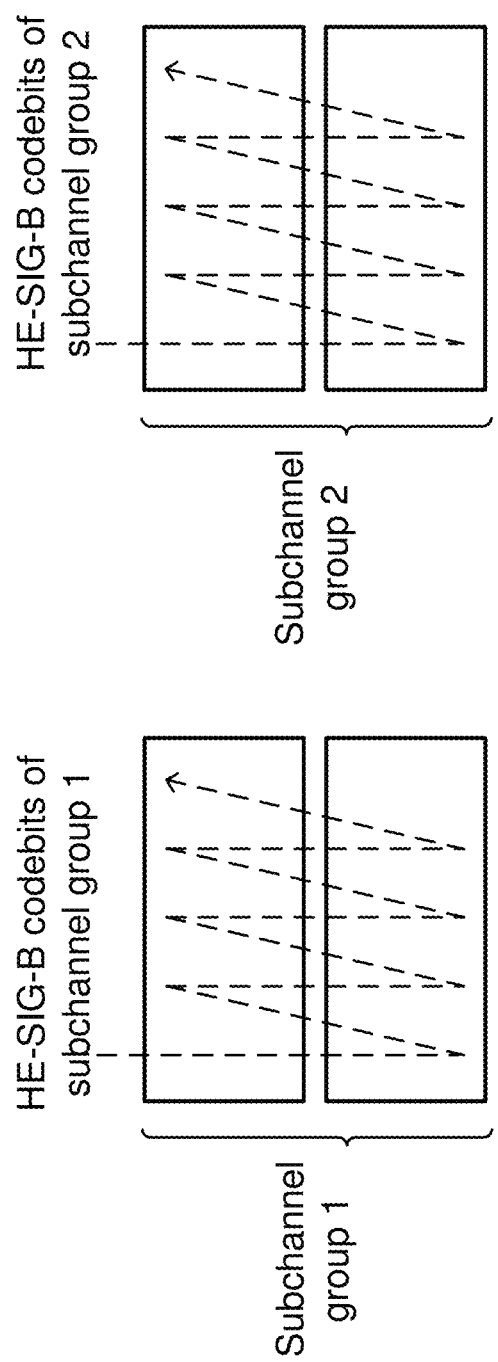
FIG. 4 depicts an illustrative schematic diagram of a high efficiency signal field encoding structure, in accordance with one or more example embodiments of the present disclosure.

FIG. 4 depicts an illustrative schematic diagram of a high efficiency signal field (HE-SIG-B) encoding structure, in accordance with one or more example embodiments of the present disclosure.

In one embodiment, for short-range applications, such as devices within proximity of each other, the duplication of the high efficiency field (e.g., HE-SIG-B) in FIG. 3 may not be needed. For example, subchannel group 1 may include two 20 MHz subchannels, as seen in FIG. 3A or FIG. 3B. However, instead of encoding HE-SIG-B1 over the first 20 MHz subchannel and repeating in a different 20 MHz subchannel, HE-SIG-B1 may be encoded over the entire subchannel group 1. The same may be true for HE-SIG-B2, where HE-SIG-B2 maybe encoded over the entire subchannel group 2. The encoding may be done using interleaving over all the subchannels of the subchannel group (e.g., subchannel groups 1 and 2). After encoding, the code bits of each subchannel group may be sent using the subchannels in the group. It is understood that the above is only an example of encoding and that other encoding mechanisms may be used in order to encode the HE-SIG-B over one or more subchannel groups.

FIGS. 5A-5B depict illustrative schematic diagrams of a high efficiency signal field encoding structure, in accordance with one or more example embodiments of the present disclosure.

In one embodiment, if HE-SIG-A indicates that the current PPDU is transmitted on 160 MHz, there may be three options: option 1: a device may only operate in one 80 MHz subchannel; option 2: the device may decode HE-SIG-B on any subchannel; and option 3: the 20 MHz subchannels may be divided into two groups.

In option 1, a device that may receive the HE-SIG-B may operate in one 80 MHz subchannel. In that case, the device may try to decode the HE-SIG-B in one of the two 80 MHz subchannels. In each 80 MHz subchannel, HE-SIG-B may be coded using the techniques outlined in the 80 MHz encoding as shown in FIGS. 3 and 4. In this case, each subchannel group may consist of four contiguous or non-contiguous 20 MHz subchannels. When the receiving device receives this data, it may decode the encoded HE-SIG-B based on that option.

In option 2, a receiving device may decode HE-SIG-B on any subchannel of the 160 MHz channel. Referring to FIG. 5, there is shown an example of HE-SIG-B encoding across 160 MHz, where two different HE-SIG-B codebit streams (e.g., HE-SIG-B1 and HE-SIG-B2) are sent independently on two 20 MHz subchannels and the rest of the 20 MHz subchannels are duplications of the two subchannels. In FIGS. 5A-5B, the first subchannel group may consist of subchannels 1, 3, 5 and 7 and the second subchannel group may consist of subchannels 2, 4, 6 and 8. The codebits of HE-SIG-B1 and the duplicated HE-SIG-B1 may be sent over the first subchannel group, and the codebits of HE-SIG-B2 and the duplicate HE-SIG-B2 may be sent over the second subchannel group. However, since the data is duplicated (e.g., HE-SIG-B1 and duplicated HE-SIG-B1), the codebits of each subchannel group may be sent over one 20 MHz subchannel and then repeated on the other subchannels of the same group. It is understood that different duplication schemes corresponding to different groups of subchannels may be utilized. For example, in FIG. 5A, HE-SIG-B1 and duplicated HE-SIG-B1, may utilize subchannels 1, 3, 5, and 7, while in FIG. 5B, HE-SIG-B1 and duplicated HE-SIG-B1, may utilize subchannels 1, 2, 3, and 4. It should be appreciated that other combinations may be possible. When the receiving device receives the encoded HE-SIG-B, the receiving device may decode the encoded HE-SIG-B based on the corresponding combination.

In option 3, the 20 MHz subchannels may be divided into two groups of 80 MHz channel, where each group consists of four 20 MHz subchannels. This option allows the codebits of the encoded HE-SIG-B to be sent in two groups of subchannels. In that case, the codebits of HE-SIG-B of each subchannel group are interleaved and jointly sent to a receiving device by the 20 MHz subchannels of the subchannel group without repetition. The receiving device may decode the encoded HE-SIG-B based on that option.

FIGS. 6A-6D depict an illustrative schematic diagrams of load balancing, in accordance with one or more example embodiments of the present disclosure.

Figure 6A:
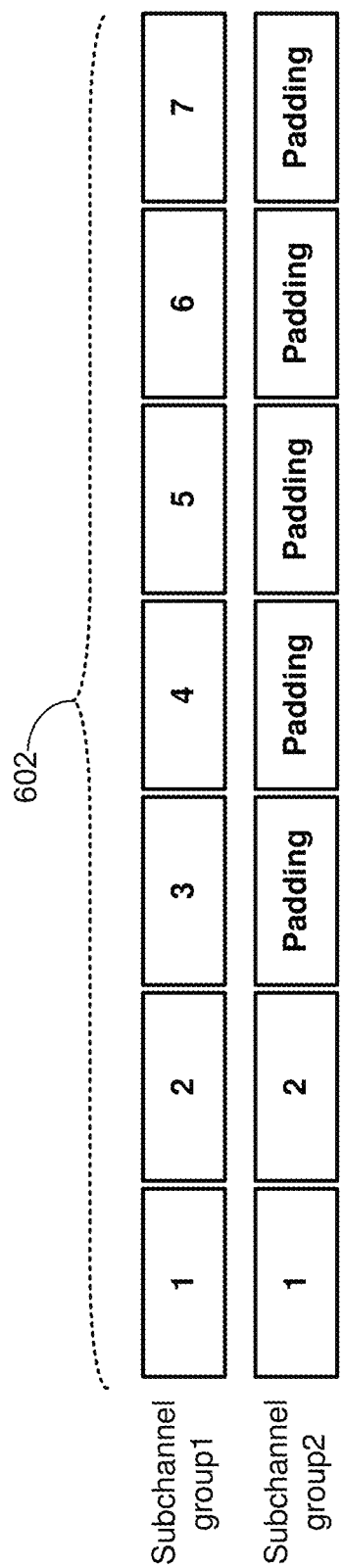
FIGS. 6A-6D depict illustrative schematic diagrams of load balancing, in accordance with one or more example embodiments of the present disclosure.

In one embodiment, since one subchannel group may have more HE-SIG-B codebits than the other(s), padding may be needed as shown in FIG. 6A. The reason is that the numbers of scheduled users in different subchannel group are usually different and the HE-SIG-B transmissions of all subchannel groups may be terminated at the same time.

Referring to FIG. 6A, there is shown blocks 602, where subchannel group 1 includes blocks 1-7 and subchannel group 2 includes blocks 1-2. However, since the size of the groups is different, padding may be utilized. Therefore, in addition to blocks 1-2, subchannel group 2 may include a number of padding blocks. In the example of FIG. 6A, subchannel group 2 may include five padding blocks. Blocks (also referred to herein as loads) may be codebits that may be representative of a user specific part, a group of user specific parts, content of an OFDM symbol, or one forward error correction (FEC) codeword.

To avoid padding, some loads may be shifted from one subchannel group to the other subchannel group. If there are more than two subchannel groups, an order may be defined for shifting the loads. For example, from subchannel group 1 to 2, from 2 to 3, and from 3 cyclically back to 1. Loads may be balanced by moving them to other subchannels such that signaling overhead and padding overhead may be minimized. In the case of HEW, some codebits from an HE-SIG-B encoding process of a subchannel group may be sent by another subchannel group. Namely, the signaling information and the corresponding data portion may be sent over different subchannel groups for the offloaded users in order to minimize the padding necessary to keep the two subchannels balanced.

Figure 6B:
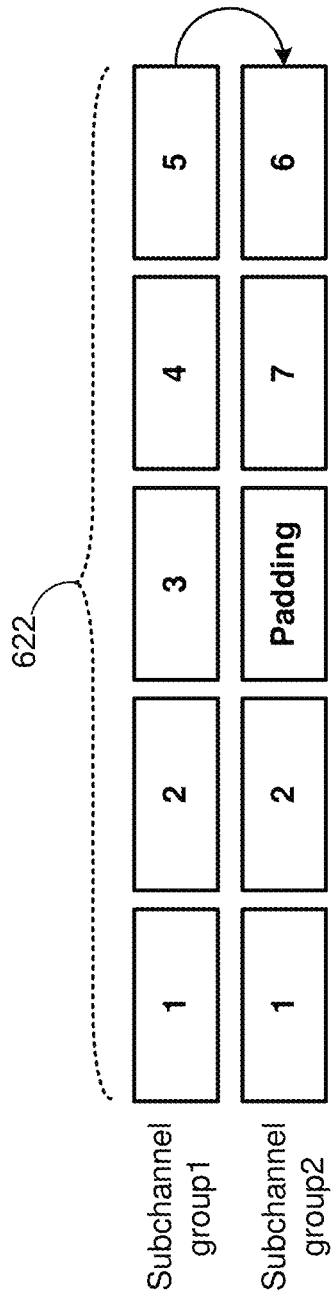
Figure 6C:
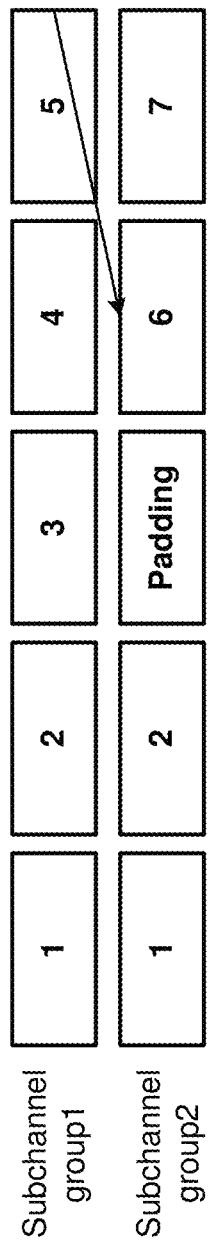

In one embodiment, and referring to FIG. 6B, the length of HE-SIG-B content for each subchannel group may be provided to a receiving device. For example, the length of the HE-SIG-B content may be known to the receiving device after decoding the common part of each subchannel group or the entire channel. In addition, the receiving device may know how many codebits each subchannel group may carry because the number of OFDM symbols for HE-SIG-B may be signaled in HE-SIG-A. Furthermore, the receiving device may not be able to decode all subchannel groups. Namely, it may only know the length of HE-SIG-B content of its own subchannel group and may not know the length of the other subchannel group(s). Therefore, the content shifted to another subchannel group may be located at the end of the payload of the unfilled subchannel group so that the receiving device may find the offloaded content without having to know the HE-SIG-B content length of the unfilled subchannel group. If the HE-SIG-B content of each subchannel group has an order, different offloading orders may exist as shown in FIGS. 6B-6D.

Referring to FIG. 6B, blocks 622 represent blocks that are allocated for subchannel group 1 and subchannel group 2. Continuing with the example in FIG. 6A, subchannel group 1 had seven blocks and subchannel group 2 had two blocks. In order to perform load balancing as in FIG. 6B, the content of blocks 6 and 7 may be shifted to the end of subchannel group 2 in place of the padding blocks, such that block 6 is at the end of subchannel group 2 and block 7 is before block 6. Another possibility may be to have block 7, at the end of subchannel group 2 and block 6 located before block 7 (shown in FIG. 6C). These formats and location of blocks may be known and/or communicated to the receiving device in order for the receiving device to be able to know the location of blocks belonging to subchannel group 1. It is understood that the above are only examples of winding back one or more blocks of a subchannel group into another subchannel group and that other configurations may be possible.

Figure 6D:
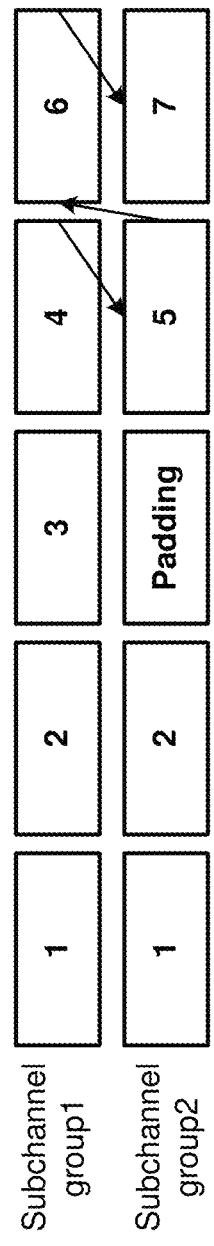

Referring to FIG. 6D, there is shown another example of offloading some blocks from subchannel group 1 to subchannel group 2. In this example, block 5 may replace a padding block located in the same timeslot of a block from subchannel group 1. For example, the same timeslot as block 4, block 5 may replace the padding block in that same timeslot of subchannel group 2. Following that, block 6 may be placed in subchannel group 1 at the next timeslot and block 7 may be placed in that same timeslot but in subchannel group 2. It is understood that the above is only an example of offloading one or more blocks of a subchannel group when overlapping timeslots into another subchannel group, and that other configurations may be possible.

Figure 7A:
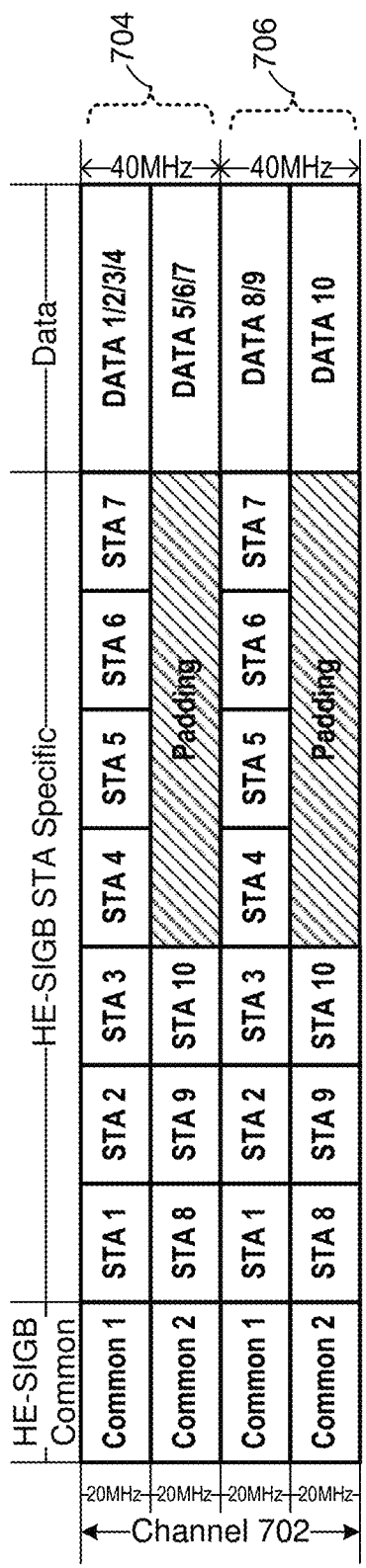
FIGS. 7A-7B depict illustrative schematic diagrams of load balancing, in accordance with one or more example embodiments of the present disclosure.
Figure 7B:
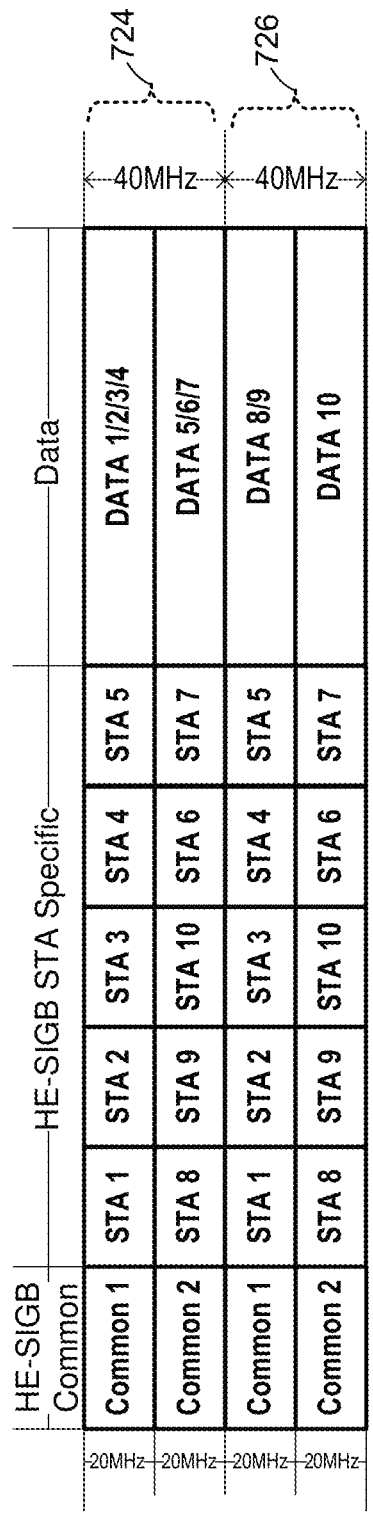

FIGS. 7A-7B depict illustrative schematic diagrams of load balancing, in accordance with one or more example embodiments of the present disclosure.

In one embodiment, for 80 MHz, channel 702 may be divided into two subchannel groups (groups 704 and 706). The HE-SIG-B may be divided into two independent encoding processes and each process covers two 20 MHz subchannels. Namely, the input of each encoding process may indicate the resource allocation for 40 MHz as shown in FIG. 7A. HE-SIG-B in the first 20 MHz subchannel may be used to indicate the resource allocations for user devices (e.g., STA 1-7), which may be allocated in the first 40 MHz subchannel group 704. HE-SIG-B in the second 20 MHz subchannel, may be used to indicate the resource allocation for user devices 8-10 (e.g., STA 8-10), which may be allocated in the second 40 MHz subchannel group 706. Repetition or duplication may be applied on the third and fourth 20 MHz subchannels.

From FIG. 7A, it may be seen that many padding symbols are due to load imbalance between the two 40 MHz subchannels. This may affect system efficiency. One solution is shown in FIG. 7B. The information of several user devices (e.g. STA 6 and STA 7) may be moved from one subchannel to another to avoid the padding in HE-SIG-B.

In one embodiment, after decoding the common part of HE-SIG-B, the receiving device may know how many user devices are scheduled in each 40 MHz subchannel (e.g., groups 724 and 726). In addition, the number of OFDM symbols in HE-SIG-B may be indicated in HE-SIG-A. With these two pieces of information (the number of OFDM symbols of HE-SIG-B and the number of scheduled user devices in each 40 MHz subchannel), the receiving device may derive whether there is offloading from one subchannel group to another (e.g. HE-SIG-B for STA 6 and? in FIG. 7B) and how many content bits are shifted. In FIG. 7B, when the receiving device maps the frequency resource allocation pattern in the common part of HE-SIG-B to each user specific part (e.g., STA 6 in FIG. 7B), the receiving device may collect the user specific parts at the end of the other subchannel group. Note that this idea may be extended to other configuration such as 80 MHz transmission or 160 MHz transmission. Note that the lengths of the common parts may be different for different subchannel groups. The location of the offloaded content of one overloaded subchannel group may be at the end of the unfilled subchannel group but the boundaries of the user specific parts between the two subchannel groups may or may not be aligned at code word or codebit level.

Figure 8A:
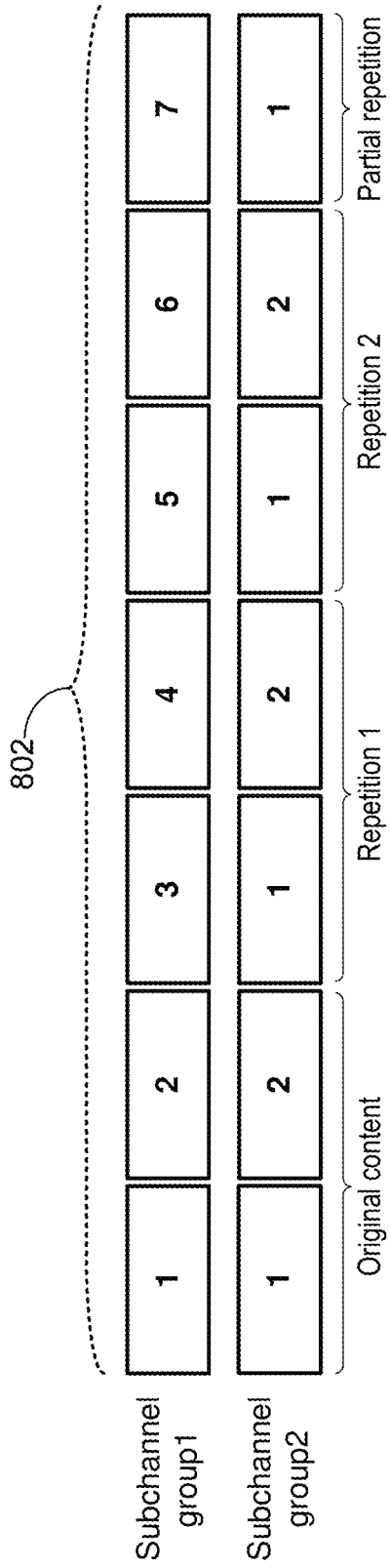
FIGS. 8A-8B depict illustrative schematic diagrams of load balancing by repetition, in accordance with one or more example embodiments of the present disclosure.
Figure 8B:
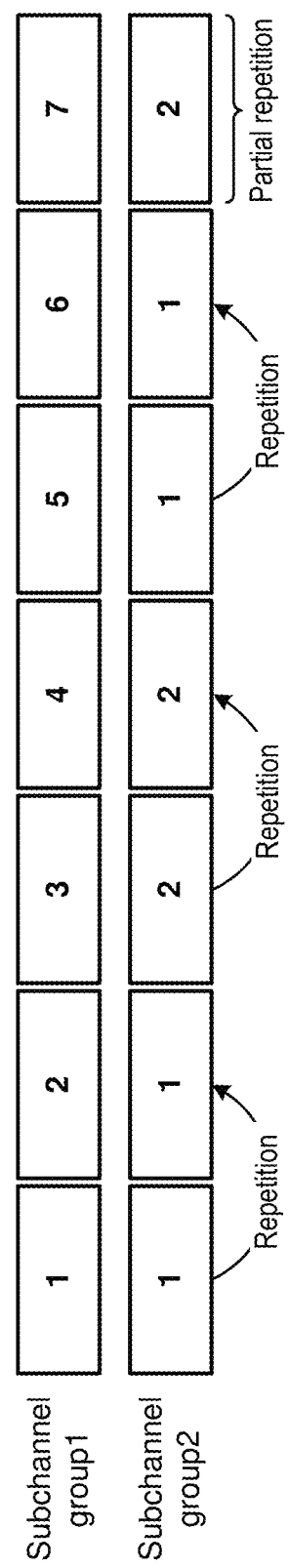

FIGS. 8A-8B depict illustrative schematic diagrams of load balancing by repetition, in accordance with one or more example embodiments of the present disclosure.

In one embodiment, since padding does not carry useful information as seen in FIG. 6A, repetition may be used to replace the padding as depicted in FIGS. 8A-8B. Blocks 802 represent blocks that are allocated for subchannel group 1 and subchannel group 2. Continuing with the example in FIG. 6, subchannel group 1 had seven blocks (e.g., blocks 1-7) and subchannel group 2 had two blocks (e.g., blocks 1-2), where padding was added to subchannel group 2 after the second block. Repetition of one or more blocks may be utilized to fill and replace the padding. For example, subchannel group 2 may contain content that is a repetition in the unused bits of the HE-SIG-B payload in subchannel group 2. That is, the contents of blocks 1 and 2 of subchannel group 2 may be repeated for the entirety of the padding blocks. This may be seen in FIG. 8A, where repetitions 1-2 and a partial repetition are used. To replace the padding. The repetition may not be full. For example, the common part may not be repeated but the user specific part is repeated. The receiving device may need to decode the common part before knowing the presence and structure of the repetition. Therefore, if the common part decoding fails, the receiver may not be able to combine the repeated common part and decode again. Once the common part decoding succeeds, the receiver may know the presence and the structure of the repetition for combining and decoding.

The repetition may be as a whole or piece-by-piece as shown in FIG. 8. For example, all the user specific parts are repeated together as in FIG. 8A. In another example, each user specific part is repeated individually as in FIG. 8B. The decoding delay and buffer size are smaller for FIG. 8B than FIG. 8A.

Figure 9A:
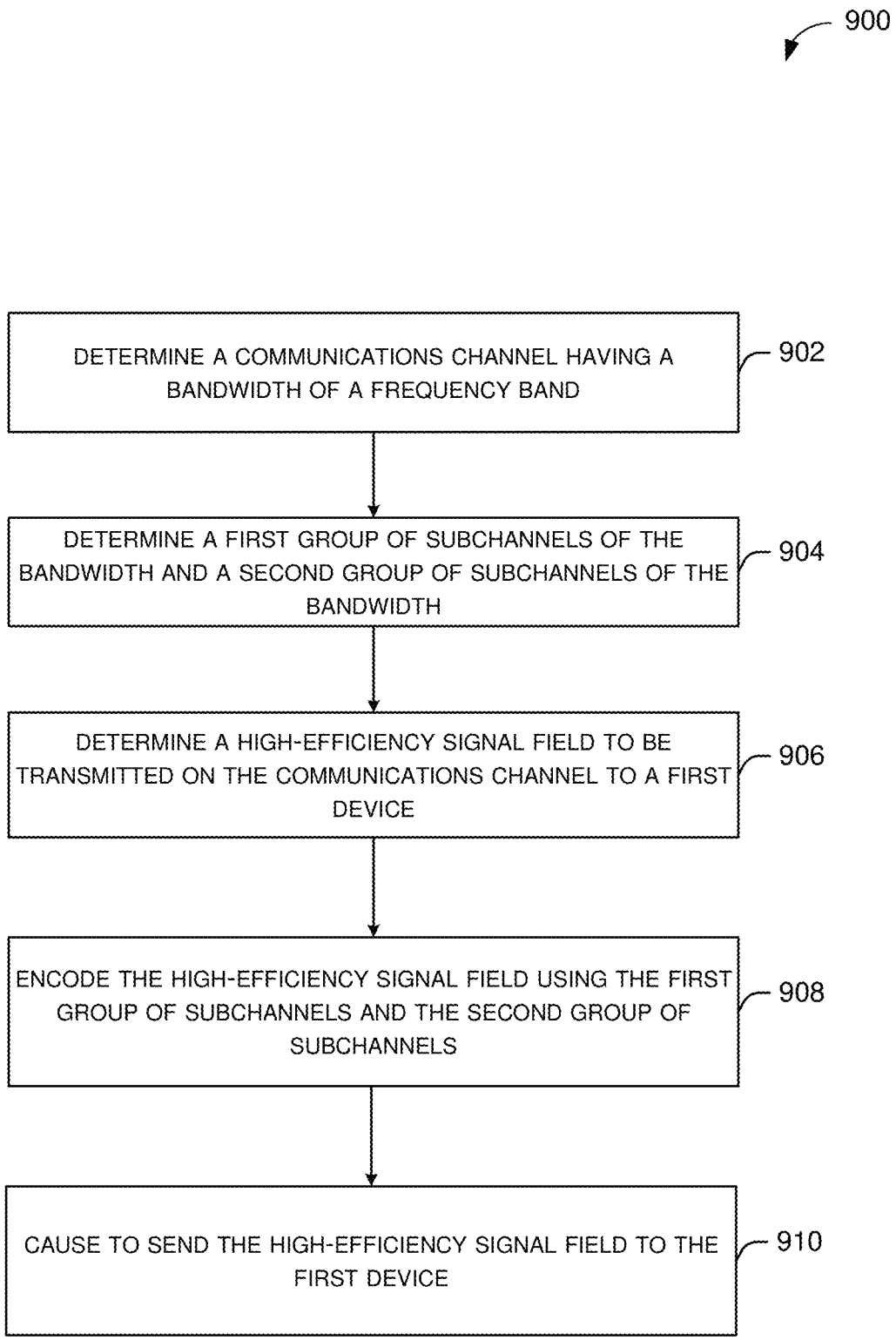
FIG. 9A depicts a flow diagram of an illustrative process for an illustrative high efficiency signal field encoding structure, in accordance with one or more embodiments of the disclosure.

FIG. 9A illustrates a flow diagram of illustrative process 900 for a high efficiency signal field encoding structure, in accordance with one or more example embodiments of the present disclosure.

At block 902, an access point (AP) or a user device may determine a communications channel having a bandwidth of a frequency band. Taking the AP as an example, and during a communications session between one or more devices, such as an AP and one or more user devices, the AP may send one or more fields as part of a preamble or data frame. HEW preambles may contain high-efficiency signal fields used to relay information to the one or more user devices, for example, during setup of the communications channel.

At block 904, the AP may determine a first group of subchannels of the bandwidth and a second group of subchannels of the bandwidth. Typically, a frequency band or channel may be assigned to the communications channel between the devices. In HEW, the frequency band or channel may comprise one or more subchannels. The AP may utilize the one or more subchannels to transmit at least the high efficiency signal fields. For example, HE-SIG-B may be encoded over the entire frequency band or channel and HE-SIG-A may be encoded over one subchannel. Typically, the encoding is performed on a subchannel or a channel basis. That is, an encoding process may be employed for a subchannel independently from the other processes E and/or subchannels. In one or more embodiments, the AP may determine one or more subchannels that may form a group of subchannels that may be used to encode HE-SIG-B using one process per group of subchannels.

At block 906, the AP may determine a high-efficiency signal field to be transmitted on the communications channel to a first device. For example, the AP may determine that the HE-SIG-B may be transmitted to a user device (e.g., user devices 120 of FIG. 1).

At block 908, the AP may encode the high-efficiency signal field (e.g., HE-SIG-B) using the first group of subchannels and the second group of subchannels. For example, the AP may determine a first group of subchannels and a second group of subchannels that may be used when encoding the HE-SIG-B field. The HE-SIG-B field may be split into parts, for example, HE-SIG-B1 and HE-SIG-B2. The AP may encode HE-SIG-B1 using the first group of subchannels and may encode HE-SIG-B2 using the second group of subchannels. In essence, two encoding processes may be used to encode the HE-SIG-B field. One process may be used for encoding HE-SIG-B1 over the first group of subchannels and another process may be used for encoding HE-SIG-B2 over the second group of subchannels. The AP may generate codebits and/or codewords that may represent the encoding of the HE-SIG-B field. For example, the AP may generate a first group of codebits and/or codewords to represent the encoded HE-SIG-B1 and may generate a second group of codebits and/or codewords to represent the encoded HE-SIG-B2. In some scenarios, HE-SIG-B1 may be duplicated. In that case, the codebits HE-SIG-B1 and the duplicated HE-SIG-B1 may be sent over the first group of subchannels or the second group of subchannels. However, since the data is duplicated, the codebits of each subchannel group may be sent over one subchannel and then repeated on the other subchannels of the same group.

The two encoding processes are likely to be different and may contain different number of codebits. The codebits may be arranged in one or more blocks. These blocks may be codebits that may be representative of the user specific part, a group of user specific parts, content of an OFDMA symbol, or one forward error correction codeword. Consequently, the first encoding process may have a first number of blocks and the second encoding process may have a second number of blocks. The number of blocks may be different between the first and the second process. In case the first number of blocks is greater than the second number of blocks, padding may be used to make the first and second subchannel groups have the same number of blocks. In one embodiment, instead of using padding, the one or more blocks may be spread between the two processes such that load balancing is achieved. For example, if the first subchannel group contains seven blocks and the second subchannel group contains two blocks, and five padding blocks, the AP may perform load balancing by shifting two of the blocks at the end of the first subchannel group to the end of the second subchannel. Consequently, first subchannel group may contain blocks 1-5, but blocks 6 and 7 are offloaded to the second subchannel group. Therefore, the second subchannel group may contain less padding blocks. It is understood that the above are only examples, and that the other load balancing techniques may be employed. In some of the scenarios, the AP may generate one or more duplicate blocks of the first subchannel group and use those to replace the padding blocks. Continuing the example above, since the second subchannel group contains only two blocks and five padding blocks, the AP may replace the five padding blocks with repetitions of the first two blocks.

At block 910, the AP may cause to send the high-efficiency signal field to the first device. In that case, the AP will send HE-SIG-B to one or more user devices using the encoding mechanism described above. The one or more user devices that receive the encoded HE-SIG-B may perform decoding by using equivalent processes to the encoding processes. That is, the one or more user devices may employ the same number of decoding processes as was done during the encoding stage at the AP.

Figure 9B:
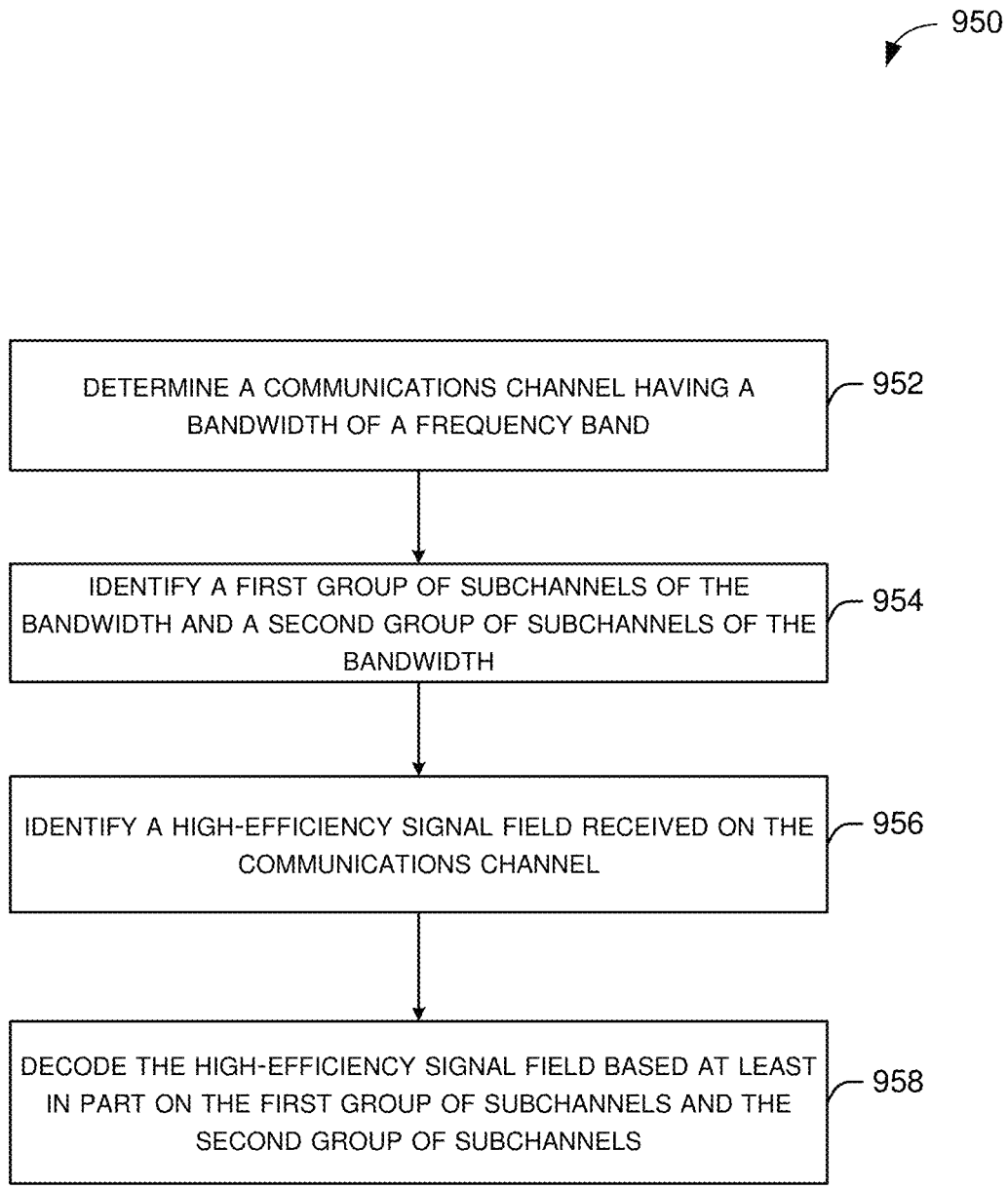
FIG. 9B depicts a flow diagram of an illustrative process for an illustrative high efficiency signal field encoding structure, in accordance with one or more embodiments of the disclosure.

FIG. 9B illustrates a flow diagram of illustrative process 950 for a high efficiency signal field encoding structure system in accordance with one or more embodiments of the disclosure.

At block 952, a user device or an AP may determine a communications channel having a bandwidth of a frequency band. Taking the user device as an example, the user device may communicate with another device (e.g., user devices 120 and/or AP 102 of FIG. 1). The user device may send and receive data frames in accordance with various wireless communication standards such as IEEE 802.11 family. In accordance with HEW, the received preambles may contain high-efficiency signal fields, which may be used, to communicate, at least in part signaling information between the devices.

At block 954, the user device may identify a first group of subchannels of the bandwidth and a second group of subchannels of the bandwidth. When the user device receives an HEW preamble, it may receive it on a frequency band or channel that may be assigned the communications channel between the user device and the other devices. Since the HEW frequency band or channel may comprise one or more subchannels, the user device may receive data on one or more subchannels. The user device may receive data that may be encoded on a first group of subchannels and a second group of subchannels.

At block 956, the user device may identify a high-efficiency signal field received on the communications channel. For example, the user device may receive an encoded HE-SIG-B field, which may be encoded by the transmitting device using one or more encoding processes. In order for the user device to decode this field, the user device may employ one or more decoding processes. In one embodiment, the user device may determine that a portion of the HE-SIG-B field is decoded on a first group of subchannels and another portion on a second group of subchannels. In order for the user device to properly decode the encoded HE-SIG-B, it may decode both portions of the HE-SIG-B, even though portions were received on different subchannels.

At block 958, the user device may decode the high-efficiency signal field based at least in part on the first group of subchannels and the second group of subchannels. For example, the user device may identify the first HE-SIG-B portion (e.g., HE-SIG-B1) and the user device may identify the second HE-SIG-B portion (e.g., HE-SIG-B2). It should be understood that the second HE-SIG-B portion may be a duplicate of the HE-SIG-B1. The user device may decode HE-SIG-B1 based at least in part on the first group of subchannels. In addition, the user device may decode HE-SIG-B2 based at least in part on the second group of subchannels. The decoding process of the user device may identify first codebits that are associated with the encoded HE-SIG-B1 and may identify second codebits that are associated with the encoded HE-SIG-B2. The first codebits may be identified in the form of first blocks and the second codebits may be identified in the form of second blocks that may be received on the group subchannels. If the transmitting device had performed load balancing in order to minimize the differences between the number of blocks in the first subchannel group and the second subchannel group, the user device may determine that some of the blocks belonging to the first subchannel group may be located in blocks of the second subchannel group. The user device may identify such blocks by various means that may include at least block ID numbers, predetermined block information, etc.

FIG. 10 shows a functional diagram of an exemplary communication station 1000 in accordance with some embodiments. In one embodiment, FIG. 10 illustrates a functional block diagram of a communication station that may be suitable for use as an AP 102 (FIG. 1) or a user device 120 (FIG. 1) in accordance with some embodiments. The communication station 1000 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 1000 may include communications circuitry 1002 and a transceiver 1010 for transmitting and receiving signals to and from other communication stations using one or more antennas 1001. The communications circuitry 1002 may include circuitry that can operate the physical layer communications and/or medium access control (MAC) communications for controlling access to the wireless medium, and/or any other communications layers for transmitting and receiving signals. The communication station 1000 may also include processing circuitry 1006 and memory 1008 arranged to perform the operations described herein. In some embodiments, the communications circuitry 1002 and the processing circuitry 1006 may be configured to perform operations detailed in FIGS. 2-9.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc. In some embodiments, the processing circuitry 1006 of the communication station 1000 may include one or more processors. In other embodiments, two or more antennas 1001 may be coupled to the communications circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device may, read-only memory (ROM), random-access memory (RAM), magnetic disk storage media, optical storage media, flash-memory devices and other storage devices and media.

In some embodiments, the communication station 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1000 may include one or more antennas 1001. The antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1000 may include one or more of a keyboard, a display, a non-volatile memory port, multiple antennas, a graphics processor, an application processor, speakers, and other mobile device elements. The display may be an LCD screen including a touch screen.

Although the communication station 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1000 may include one or more processors and may be configured with instructions stored on a computer-readable storage device memory.

FIG. 11 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1100 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., a speaker), a high efficiency signal field encoding device 1119, a network interface device/transceiver 1120 coupled to antenna(s) 1130, and one or more sensors 1128, such as a global positioning system (GPS) sensor, compass, accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The high efficiency signal field encoding device 1119 may be carry out or perform any of the operations and processes (e.g., processes 900 and 950) described and shown above. For example, the high efficiency signal field encoding device 1119 may be configured to determine a communication channel between the device and a first device. The high efficiency signal field encoding device 1119 may be configured to determine one or more subchannels of the communication channel. The high efficiency signal field encoding device 1119 may be configured to determine a first high efficiency signal field and a second high efficiency signal field included in a high efficiency frame to be sent on the communication channel. The high efficiency signal field encoding device 1119 may be configured to encode the second high efficiency signal field into one or more groups based at least in part on the one or more subchannels. It is understood that the above are only a subset of what the high efficiency signal field encoding device 1119 may be configured to perform and that other functions included throughout this disclosure may also be performed by the high efficiency signal field encoding device 1119.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software. The operations and processes (e.g., processes 900 and 950) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

According to example embodiments of the disclosure, there may be a device. The device may include at least one memory that stores computer-executable instructions, and at least one processor of the one or more processors configured to access the at least one memory, wherein the at least one processor of the one or more processors is configured to execute the computer-executable instructions to determine a first group of subchannels of the bandwidth and a second group of subchannels of the bandwidth. The at least one processor of the one or more processors may be configured to execute the computer-executable instructions to determine a high-efficiency signal field to be transmitted on the communications channel to a first device. The at least one processor of the one or more processors may be configured to execute the computer-executable instructions to encode the high-efficiency signal field using the first group of subchannels and the second group of subchannels. The at least one processor of the one or more processors may be configured to execute the computer-executable instructions to cause to send the high-efficiency signal field to the first device.

The implementations may include one or more of the following features. The instructions to encode the high-efficiency signal field further may include instructions to split the high-efficiency signal field into a first high-efficiency signal part and a second high-efficiency signal part. The at least one processor of the one or more processors may be configured to execute the computer-executable instructions to encode the first high-efficiency signal part using the first group of subchannels. The at least one processor of the one or more processors may be configured to execute the computer-executable instructions to encode the second high-efficiency signal part using the second group of subchannels. The at least one processor is further configured to execute the computer-executable instructions to send a duplicate of the first high-efficiency signal part is sent on one subchannel of the first group of subchannels, and a duplicate of the second high-efficiency signal part is sent on one subchannel of the second group of subchannels. The at least one processor is further configured to execute the computer-executable instructions to generate one or more first codebits based at least in part on the encoded first high-efficiency signal part. The at least one processor of the one or more processors may be configured to execute the computer-executable instructions to generate one or more second codebits based at least in part on the encoded second high-efficiency signal part. The at least one processor is further configured to execute the computer-executable instructions to arrange the one or more first codebits into one or more first blocks. The at least one processor of the one or more processors may be configured to execute the computer-executable instructions to arrange the one or more second codebits into one or more second blocks. A number of the one or more first blocks have more codebits than a number of the one or more second blocks. The at least one processor is further configured to execute the computer-executable instructions to determine that a number of the one or more second blocks have less codebits than the number of the one or more first blocks. The at least one processor of the one or more processors may be configured to execute the computer-executable instructions to generate one or more duplicate blocks of at least one of the one or more second blocks. The at least one processor of the one or more processors may be configured to execute the computer-executable instructions to cause to send the one or more duplicate blocks using the second group of subchannels. The at least one processor is further configured to execute the computer-executable instructions to cause to send one of the one or more first blocks using the second group of subchannels. The at least one processor of the one or more processors may be configured to execute the computer-executable instructions to cause to send one of the one or more second blocks using the first group of subchannels. The device may further include a transceiver configured to transmit and receive wireless signals. The device may further include an antenna coupled to the transceiver.

According to example embodiments of the disclosure, there may be a non-transitory computer-readable medium storing computer-executable instructions which, when executed by a processor, cause the processor to perform operations. The operations may include determining a communications channel having a bandwidth of a frequency band. The operations may include identifying a first group of subchannels of the bandwidth and a second group of subchannels of the bandwidth. The operations may include identifying a high-efficiency signal field received on the communications channel. The operations may include decoding the high-efficiency signal field based at least in part on the first group of subchannels and the second group of subchannels.

The implementations may include one or more of the following features. The operations may include the operations to decode the high-efficiency signal field further include operations comprising identifying a first high-efficiency signal part of the high-efficiency signal field and a second high-efficiency signal part of the high-efficiency signal field. The operations may include decoding the first high-efficiency signal part based at least in part on the first group of subchannels. The operations may include decoding the second high-efficiency signal part based at least in part on the second group of subchannels. A duplicate of the first high-efficiency signal part is received on one subchannel of the first group of subchannels, and a duplicate of the second high-efficiency signal part is received on one subchannel of the second group of subchannels. The computer-executable instructions cause the processor to further perform operations comprising identifying one or more first codebits based at least in part on the decoded first high-efficiency signal part. The operations may include identifying one or more second codebits based at least in part on the decoded second high-efficiency signal part. The computer-executable instructions cause the processor to further perform operations comprising identifying one or more first blocks of the one or more first codebits into. The operations may include identifying one or more second blocks of the one or more second codebits. A number of the one or more first blocks are greater than a number of the one or more second blocks. The computer-executable instructions cause the processor to further perform operations comprising identifying one of the one or more first blocks based at least in part on the second group of subchannels. The operations may include identifying one of the one or more second blocks based at least in part on the first group of subchannels.

In example embodiments of the disclosure, there may be a method. The method may include determining a communications channel having a bandwidth of a frequency band, determining a first group of subchannels of the bandwidth and a second group of subchannels of the bandwidth, determining a high-efficiency signal field to be transmitted on the communications channel to a first device, encoding the high-efficiency signal field using the first group of subchannels and the second group of subchannels, and causing to send the high-efficiency signal field to the first device.

Implementations may include one or more of the following features. The operations encoding the high-efficiency signal field further may include splitting the high-efficiency signal field into a first high-efficiency signal part and a second high-efficiency signal part, encoding the first high-efficiency signal part using the first group of subchannels, and encoding the second high-efficiency signal part using the second group of subchannels. The method may further include operations comprising sending a duplicate of the first high-efficiency signal part is sent on one subchannel of the first group of subchannels, and a duplicate of the second high-efficiency signal part is sent on one subchannel of the second group of subchannels. The method may further include operations for generating one or more first codebits based at least in part on the encoded first high-efficiency signal part, and generating one or more second codebits based at least in part on the encoded second high-efficiency signal part. The method further may include operations may include arranging the one or more first codebits into one or more first blocks, and arranging the one or more second codebits into one or more second blocks. A number of the one or more first blocks have more codebits than a number of the one or more second blocks. The method further may include operations for determining that a number of the one or more second blocks have less codebits than the number of the one or more first blocks, generating one or more duplicate blocks of at least one of the one or more second blocks, and causing to send the one or more duplicate blocks using the second group of subchannels. The method further may include operations for causing to send one of the one or more first blocks using the second group of subchannels, and causing to send one of the one or more second blocks using the first group of subchannels.

In example embodiments of the disclosure, there may be an apparatus. The apparatus may include means for determining a communications channel having a bandwidth of a frequency band. The apparatus may include means for determining a first group of subchannels of the bandwidth and a second group of subchannels of the bandwidth. The apparatus may include means for determining a high-efficiency signal field to be transmitted on the communications channel to a first device. The apparatus may include means for encoding the high-efficiency signal field using the first group of subchannels and the second group of subchannels. The apparatus may include means for causing to send the high-efficiency signal field to the first device.

Implementations may include one or more of the following features. The operations for encoding the high-efficiency signal field may further include means for splitting the high-efficiency signal field into a first high-efficiency signal part and a second high-efficiency signal part, means for encoding the first high-efficiency signal part using the first group of subchannels, and means for encoding the second high-efficiency signal part using the second group of subchannels. The apparatus may further include operations comprising means for sending a duplicate of the first high-efficiency signal part is sent on one subchannel of the first group of subchannels, and a duplicate of the second high-efficiency signal part is sent on one subchannel of the second group of subchannels. the apparatus may further include operations comprising means for generating one or more first codebits based at least in part on the encoded first high-efficiency signal part, and means for generating one or more second codebits based at least in part on the encoded second high-efficiency signal part. The apparatus may further include operations comprising means for arranging the one or more first codebits into one or more first blocks, and means for arranging the one or more second codebits into one or more second blocks. A number of the one or more first blocks have more codebits than a number of the one or more second blocks. the apparatus may further include operations comprising means for determining that a number of the one or more second blocks have less codebits than the number of the one or more first blocks, means for generating one or more duplicate blocks of at least one of the one or more second blocks, and means for causing to send the one or more duplicate blocks using the second group of subchannels. The apparatus may further include operations comprising means for causing to send one of the one or more first blocks using the second group of subchannels, and means for causing to send one of the one or more second blocks using the first group of subchannels.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for encoding one or more high-efficiency signal fields of a high-efficiency frame for transmission over a channel, the device comprising processing circuitry coupled to storage, the processing circuitry configured to:

determine a first high-efficiency signal field of the high-efficiency frame;
determine a second high-efficiency signal field of the high-efficiency frame;
encode the first high-efficiency signal field using a first encoding process associated with a first subchannel group;
encode the second high-efficiency signal field using a second encoding process associated with a second subchannel group; and
determine a number of encoding processes is no more than three encoding processes, wherein the number of encoding processes includes the first encoding process and the second encoding process;
cause to send the high-efficiency frame to a first device over the channel.

2. The device of claim 1, wherein the first encoding process is different from the second encoding process.

3. The device of claim 1, wherein to cause to send the high-efficiency frame comprises the processing circuitry being further configured to:
determine the bandwidth to be equal to 40 MHz;
cause to send the first high-efficiency signal field over the first subchannel group, wherein the first subchannel group comprises a first subchannel; and
cause to send the second high-efficiency signal field over the second subchannel group, wherein the second subchannel group comprises a second subchannel.

4. The device of claim 3, wherein the first subchannel is a 20 MHz channel, and wherein the second subchannel is a 20 MHz channel.

5. The device of claim 1, wherein to cause to send the high-efficiency frame comprises the processing circuitry being further configured to:
determine the bandwidth to be equal to 80 MHz;
determine the first subchannel group includes a first subchannel and a third subchannel of the channel;
determine the second subchannel group includes a second subchannel and a fourth subchannel of the channel;
cause to send the first high-efficiency signal field over the first subchannel;
cause to send the second high-efficiency signal field over the second subchannel;
cause to send a duplicate of the first high-efficiency signal field over the third subchannel; and
cause to send a duplicate of the second high-efficiency signal field over the fourth subchannel.

6. The device of claim 5, wherein the first subchannel is adjacent to the second subchannel, and wherein the third subchannel is adjacent to the fourth subchannel.

7. The device of claim 1, wherein to cause to send the high-efficiency frame comprises the processing circuitry being further configured to:
determine the bandwidth to be equal to 160 MHz;
determine the first subchannel group includes a first subchannel, a third subchannel, a fifth subchannel, and a seventh subchannel of the channel;
determine the second subchannel group includes a second subchannel, a fourth subchannel, a sixth subchannel, and an eighth subchannel of the channel;
cause to send a copy of the first high-efficiency signal field over the first subchannel group;
cause to send a copy of the second high-efficiency signal field over the second subchannel group.

8. The device of claim 1, further comprising a transceiver configured to transmit and receive wireless signals.

9. The device of claim 7, further comprising an antenna coupled to the transceiver.

10. A non-transitory computer-readable medium storing computer-executable instructions which when executed by one or more processors result in performing operations comprising:
determining a first high-efficiency signal field of the high-efficiency frame;
determining a second high-efficiency signal field of the high-efficiency frame;
encoding the first high-efficiency signal field using a first encoding process associated with a first subchannel group;
encoding the second high-efficiency signal field using a second encoding process associated with a second subchannel group; and
determining a number of encoding processes is no more than three encoding processes, wherein the number of encoding processes includes the first encoding process and the second encoding process;
causing to send the high-efficiency frame to a first device over the channel.

11. The non-transitory computer-readable medium of claim 10, wherein the first encoding process is different from the second encoding process.

12. The non-transitory computer-readable medium of claim 10, wherein the operations causing to send the high-efficiency frame further comprise:
determining the bandwidth to be equal to 40 MHz;
causing to send the first high-efficiency signal field over the first subchannel group, wherein the first subchannel group comprises a first subchannel; and
causing to send the second high-efficiency signal field over the second subchannel group, wherein the second subchannel group comprises a second subchannel.

13. The non-transitory computer-readable medium of claim 12, wherein the first subchannel is a 20 MHz channel, and wherein the second subchannel is a 20 MHz channel.

14. The non-transitory computer-readable medium of claim 10, wherein the operations causing to send the high-efficiency frame further comprise:
determining the bandwidth to be equal to 80 MHz;
determining the first subchannel group includes a first subchannel and a third subchannel of the channel;
determining the second subchannel group includes a second subchannel and a fourth subchannel of the channel;
causing to send the first high-efficiency signal field over the first subchannel;
causing to send the second high-efficiency signal field over the second subchannel;
causing to send a duplicate of the first high-efficiency signal field over the third subchannel; and
causing to send a duplicate of the second high-efficiency signal field over the fourth subchannel.

15. The non-transitory computer-readable medium of claim 14, wherein the first subchannel is adjacent to the second subchannel, and wherein the third subchannel is adjacent to the fourth subchannel.

16. The non-transitory computer-readable medium of claim 10, wherein the operations causing to send the high-efficiency frame further comprise:
determining the bandwidth to be equal to 160 MHz;
determining the first subchannel group includes a first subchannel, a third subchannel, a fifth subchannel, and a seventh subchannel of the channel;

determining the second subchannel group includes a second subchannel, a fourth subchannel, a sixth subchannel, and an eighth subchannel of the channel;

causing to send a copy of the first high-efficiency signal field over the first subchannel group;

causing to send a copy of the second high-efficiency signal field over the second subchannel group.

17. A method comprising:

determining, by one or more processors, a first high-efficiency signal field of the high-efficiency frame;

determining a second high-efficiency signal field of the high-efficiency frame;

encoding the first high-efficiency signal field using a first encoding process associated with a first subchannel group;

encoding the second high-efficiency signal field using a second encoding process associated with a second subchannel group;

determining a number of encoding processes is no more than three encoding processes, wherein the number of encoding processes includes the first encoding process and the second encoding process; and causing to send the high-efficiency frame to a first device over the channel.

18. The method of claim 17, wherein to cause to send the high-efficiency frame further comprises:

determining the bandwidth to be equal to 40 MHz;

causing to send the first high-efficiency signal field over the first subchannel group, wherein the first subchannel group comprises a first subchannel; and causing to send the second high-efficiency signal field over the second subchannel group, wherein the second subchannel group comprises a second subchannel.

19. The method of claim 18, wherein the first subchannel is a 20 MHz channel, and wherein the second subchannel is a 20 MHz channel.

\* \* \* \* \*